(12) United States Patent
Artusi

(10) Patent No.: US 12,032,228 B2
(45) Date of Patent: Jul. 9, 2024

(54) MOUNT FOR SPECTACLES

(71) Applicant: SAFILO SOCIETÀ AZIONARIA FABBRICA ITALIANA LAVORAZIONE OCCHIALI S.P.A., Padua (IT)

(72) Inventor: Ampelio Artusi, Padua (IT)

(73) Assignee: SAFILO—Società Azionaria Fabbrica Italiana Lavorazione Occhiali—S.p.A., Padua (IT)

( * ) Notice: Subject to any disclaimer, the term of this patent is extended or adjusted under 35 U.S.C. 154(b) by 451 days.

(21) Appl. No.: 17/613,431

(22) PCT Filed: May 19, 2020

(86) PCT No.: PCT/EP2020/063880
§ 371 (c)(1),
(2) Date: Nov. 22, 2021

(87) PCT Pub. No.: WO2020/244918
PCT Pub. Date: Dec. 10, 2020

(65) Prior Publication Data
US 2022/0214561 A1  Jul. 7, 2022

(30) Foreign Application Priority Data
Jun. 6, 2019  (IT) .......................... 102019000008262

(51) Int. Cl.
*G02C 5/22* (2006.01)
(52) U.S. Cl.
CPC ....... *G02C 5/2254* (2013.01); *G02C 2200/22* (2013.01)

(58) Field of Classification Search
CPC .............. G02C 5/2254; G02C 2200/22; G02C 2200/06; G02C 2200/12; G02C 5/14
See application file for complete search history.

(56) References Cited

U.S. PATENT DOCUMENTS

| 8,827,444 B1 | 9/2014 | Koo |
| 2013/0229613 A1* | 9/2013 | Carpenter ............ G02C 5/2209 |
| | | 351/113 |

(Continued)

FOREIGN PATENT DOCUMENTS

| CN | 203838432 U | 9/2014 |
| EP | 0863424 A1 | 9/1998 |

(Continued)

*Primary Examiner* — George G. King
*Assistant Examiner* — Anna Smith
(74) *Attorney, Agent, or Firm* — Volpe Koenig

(57) ABSTRACT

A spectacle mount is described, comprising a front frame (2) with lateral lugs (4) and respective rods (5), each rod-lug pair comprising a first and a second articulation element (6, 7) and an insert (12) constrained to the first articulation element (6), a recess (17) being defined in the insert (12) and intended to receive, at least partially, a head (11) of the second articulation element (7) during the movement relative to the first articulation element (6), a shoulder surface (22) defined on the insert (12) being able to contact the head (11) during the articulation movement, so that the second articulation element (7) is movable from and towards open and closed positions of the rod on the mount, in a guided and contacted manner between the insert (12) and the first articulation element (6), to achieve a hinge movement between the lug (4) and the rod (5).

11 Claims, 6 Drawing Sheets

(56) References Cited

U.S. PATENT DOCUMENTS

2013/0239366 A1    9/2013  Kim
2018/0252939 A1    9/2018  Artusi
2019/0353923 A1*  11/2019  Ricart Gisbert ......... G02C 1/08

FOREIGN PATENT DOCUMENTS

| FR | 1009345 A  |   | 5/1952  |             |
|----|------------|---|---------|-------------|
| JP | 2011095691 A |   | 5/2011  |             |
| JP | 3171796 U  | * | 11/2011 | ............. G02C 5/008 |
| WO | 2018127619 A1 |   | 7/2018  |             |

* cited by examiner

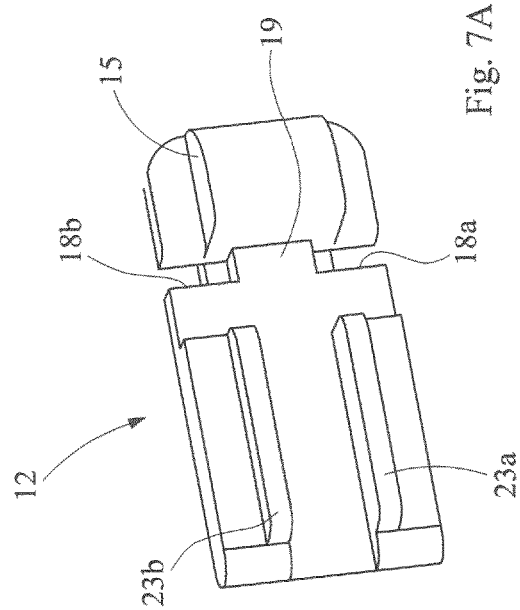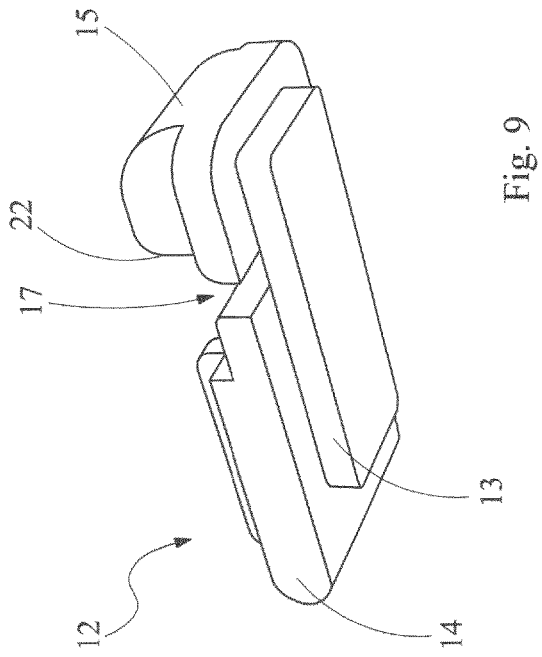
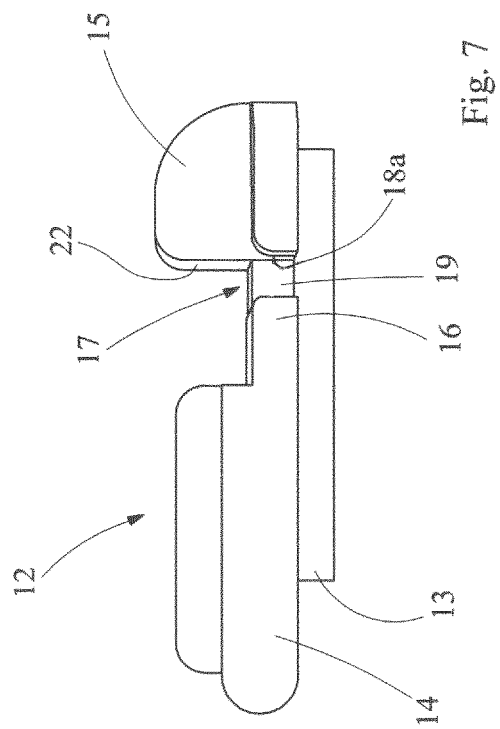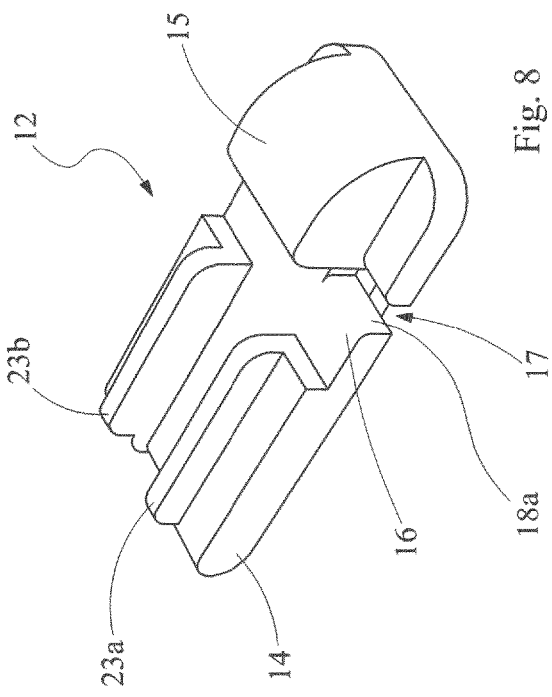

MOUNT FOR SPECTACLES

TECHNICAL FIELD

The present invention relates to a mount for spectacles having the features set out in the preamble of the main claim no. 1.

TECHNOLOGICAL BACKGROUND

In the specific technical field, mounts for spectacles are well known in which the articulation of the rods to the front frame is achieved by means of hinge devices having respective pins and eyelet seats rotatably associated with each other, the hinge elements of these devices being suitably made integral with the rod and the lug of the mount.

This type of solution, in its multiple versions made available by the prior art, traditionally entails some limits, including the possible undesired loosening of the screw or the hinge pin, the need to make a plurality of components required for the hinge articulation, the dimensions dictated by the necessary components, as well as the weight of the hinge device which is not suitable for use in light-type mounts.

Solutions for articulating the rod to the front lug of the mount are also known which do not provide for any traditional hinge structure of the aforesaid type. An example is known from FR 1009345, in which a system for articulation with resilient locking of the rod to the lug is described. It provides that the rod end facing the front lug is divided into three distinct parts by a length sufficient to provide them with a mutual resilient behaviour. The folded end of the central part, jointly with the lateral parts, holds the rod in an articulated manner around a pin formation provided on the mount.

Another type of solution is shown in JP 2011/095691, in which one or more resilient sheet elongated elements are obtained, by cutting, at the end of the rod facing the lug and are arranged to engage, with their folded ends, corresponding openings obtained through the lug portion, thus achieving the articulated retaining of the rod on the lug of the mount.

Another known solution is described in the Italian patent application 102015000060759 on behalf of the same applicant, in which the articulation of the rod to the lug is achieved with a coupling which is more stable than the previous solutions, as well as suitable for improving the fit comfort. However, such a solution has some limitations, linked to the mutual contact of the assembled components during the hinge movement thereof.

In fact, the metal parts of the rod and the lug placed in mutual contact with relative sliding can be subject to superficial wear, due to the friction during the repeated rotations of the rod.

The possible occurrence of the phenomenon of wear in the life cycle of the hinge, with consequent damage to the surfaces of the parts involved, can cause a localized aesthetic defect, even before compromising the functionality of the hinge with a possible deterioration of the regularity of operation of the articulation joint.

The anti-aesthetic effects of wear are also more visible when surface finishing treatments characterised by not particularly high mechanical strength have been applied to the hinge for economic, technical and/or aesthetic reasons.

The onset of aesthetic damage is more likely if the lug (front frame) and/or the rod are made of material (typically metal) coated with a coloured varnish, or with a thin decorative film (for example a polymeric film decorated with digital printing), or with a so-called PVD (physical vapor deposition) treatment.

The finishing or coating coverings referred to herein, generally having a function which is not only decorative, are typically characterised by a particularly thin thickness, which can be easily affected by localized removal of successive layers caused by the components with which they come into contact during relative sliding. The aesthetic damage is in fact substantially due to the more or less deep or regular removal of the surface coating, up to the appearance of the substrate (underlying material) in the case of complete removal.

DESCRIPTION OF THE INVENTION

The main object of the invention is to provide a mount for spectacles with elements for articulating the rods at the front of the mount, which is structurally and functionally designed to overcome the limits highlighted with reference to the mentioned prior art.

This object and others which will become more apparent below are achieved by a mount for spectacles made according to the appended claims.

According to a main aspect of the invention, a mount for spectacles comprises a front frame having respective lateral lugs for the articulation of respective rods, in order to articulatedly connect each rod to the front frame, in each of the rod-lug pairs one of the rod and the lug comprising a first articulation element which can articulatedly couple to a second articulation element of the other of the rod and lug, the first and second articulation element hingedly connecting each rod to the relevant lug, each first articulation element comprising a first part extending into a second part folded onto the first part in a position facing and at a distance from the first part, the second part comprising a pair of arms extending in parallel and at a distance as far as respective free ends of the arms, each second articulation element comprising a body extending into an end head, the head being received between the first and second parts of the first articulation element at the free ends of the arms, the mount further comprising an insert which is structurally independent of the first and second articulation elements and constrained to the first articulation element, a portion of the insert being arranged between the head and the first part of the first articulation element and facing said part, a recess being defined in the insert and intended to at least partially receive the head during the relative articulation movement of the first and second articulation elements, a shoulder surface defined on the insert being able to contact the head during the articulation movement when the head is engaged in the recess, so that during the movement between respective open and closed positions of the rod on the mount, the second articulation element can be moved to and from said positions, in a guided and contacted manner between the insert and the second part of the first articulation element, to achieve a hinge movement between the lug and the rod, the head remaining in a position between the arms and the insert portion during the movement of the rod between the open and closed position, and engaging the recess in the closed position, contacted by the shoulder surface.

BRIEF DESCRIPTION OF THE DRAWINGS

Further features and advantages of the invention will become more apparent from the following detailed description of some preferred embodiments thereof illustrated, by way of non-limiting example, with reference to the appended drawings, in which:

FIG. 7 is a front elevation view, on an enlarged scale, of a further component of the detail of FIGS. 2-4, FIGS. 7A, 8 and 9 are perspective views of the component of FIG. 7, FIGS. 10 to 12 are partial perspective views of the detail of the previous figures in distinct relative positions of the rod and lug during their relative rotational movement.

PREFERRED EMBODIMENTS OF THE INVENTION

Figure 1:
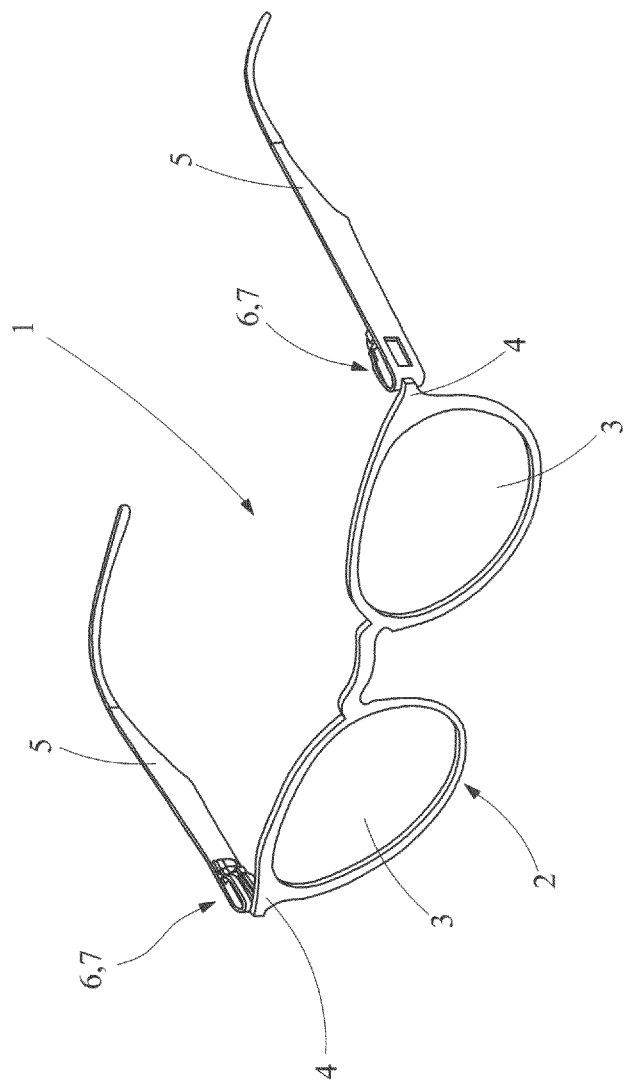
FIG. 1 is a perspective view of a mount for spectacles made according to an example of the present invention.

With reference to the aforementioned figures, reference numeral 1 indicates as a whole a mount for spectacles, made according to an embodiment of the present invention, comprising a front frame 2, for holding lenses 3, provided with a pair of opposite lateral lugs 4 for articulatedly connecting respective rods 5 to the front frame.

For the articulated connection of each rod/lug pair, one of the rod and lug comprises a first articulation element, indicated with 6, and the other of the rod and lug comprises a second articulation element, indicated with 7, said first and second articulation element 6, 7 thus hingedly connecting each rod to the relevant lug.

In the preferred example described herein, the first articulation element 6 is provided on the rod 5 and the second articulation element 7 is provided on the lug 5 of the mount; however, an embodiment is also possible in which, conversely, the first and the second articulation element are provided respectively on the lug and on the rod.

Due to the structural and functional identity, the articulated coupling between the first and the second articulation element of only one of the rods 5 to the corresponding lug 6 of the front frame 2 of the mount will be described in detail below.

As can be seen from the figures, the rods 5 and the corresponding lugs 4 have a preferred thin slab shape. In other words, the cross section of the rod (and of the corresponding lug) has a rod height dimension, measured substantially parallel to the temporal region of the head when the spectacles are worn, that is far greater than the rod thickness measured transversely to the height. The shape of the portion having a thin thickness, together with the choice of materials with which it is made, preferably metal, gives the rod overall features of high lightness, with reduced dimensions, for a particularly light longitudinal extension of the rod, and such as to also confer to the mount an overall design of appreciable aesthetic impact. In this regard, a metal sheet structure is particularly suitable in shaping the rods and the front frame of the mount.

The thin-thickness slab shape is also provided in the construction of the first and second articulation elements 6, 7, as will become apparent in the following description.

The first articulation element 6 comprises a first part 6a, formed integrally with or connectable to the body of the rod 5, which extends into a second part 6b, this latter part being folded onto the first part 6a so as to be facing the same at a predetermined distance. Such a configuration can be obtained starting from the slab-shaped structure of the rod, which is substantially flattened, for example obtained from a metal sheet, by folding the second part 6b by approximately 180° onto the first part 6a of the first articulation element.

The second part 6b of the first element 6 comprises a pair of arms 8 extending in parallel and at a distance from each other, which extend from the folding region of the second part with respect to the first part, up to the respective free ends 8a of said arms.

Reference numeral 9 indicates an opening passing through the first part 6a of the first articulation element, the function of which opening will become apparent below.

The second articulation element 7 comprises a body 10, preferably formed integrally with the lug 4, which extends, on the side opposed to the lug, into an enlarged end head 11. In the coupling between the articulation elements, the head 11 is able to be received between the first and second parts 6a, 6b of the first articulation element 6, at the free ends 8a of the arms 8, substantially performing the function of hinge pin between rod and lug, in the operating mode that will be described hereinafter.

The mount 1 also comprises an insert, generally indicated with reference numeral 12, which is structurally independent of the first and second articulation elements and is designed to be constrained to the first articulation element 6. Said insert 12 is designed to be inserted and received between the first and second articulation elements, when assembled together, so as to cooperate with the same to achieve the functions of the hinge coupling between the rod and the lug.

The insert 12 comprises a slab-shaped base 13 from which a main insert body 14 extends, intended to be housed, at least in part, in the space defined between the first and second parts 6a, 6b of the first articulation element 6, and extends further, beyond the region of the arms 8, into a shoulder 15 extending from the base 13.

Said base 13, preferably with a rectangular plan, is designed to engage, in a formfit, the opening 9 formed in the first part 6a of the element 6, in order to make the insert 12 integral with the first articulation element 6.

Figure 3:
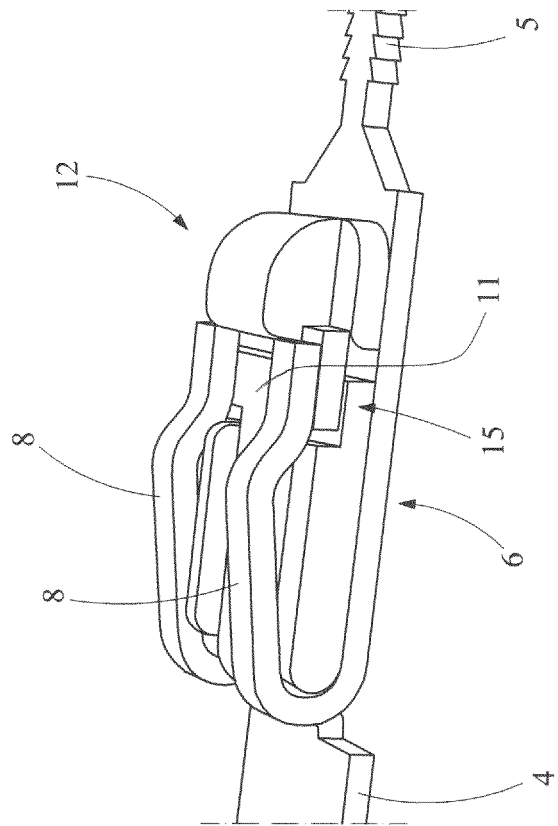
FIGS. 2 to 4 are partial perspective views, on an enlarged scale, of a detail of the mount of the previous figure, relating to the articulation of one of the rods to the relative front lug of the mount.
Figure 2:
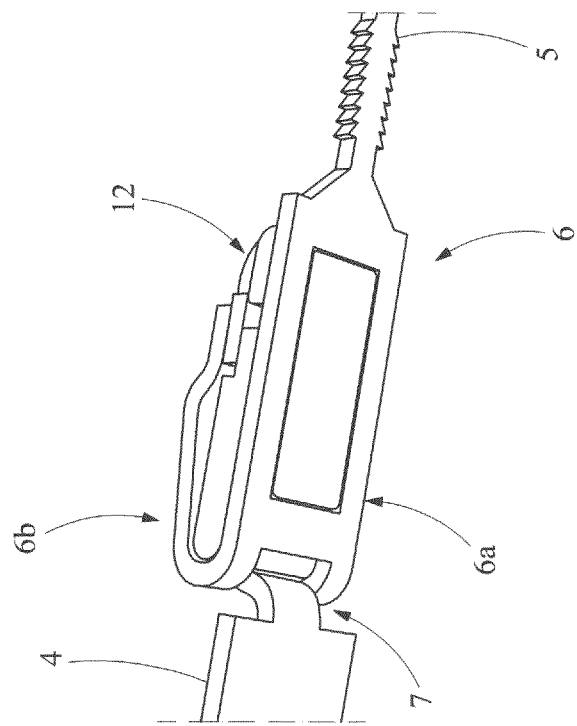
Figure 4:
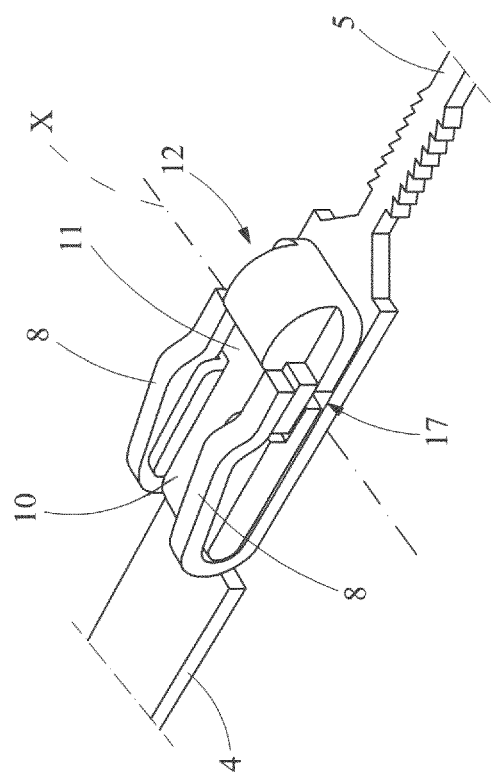
Figure 6:
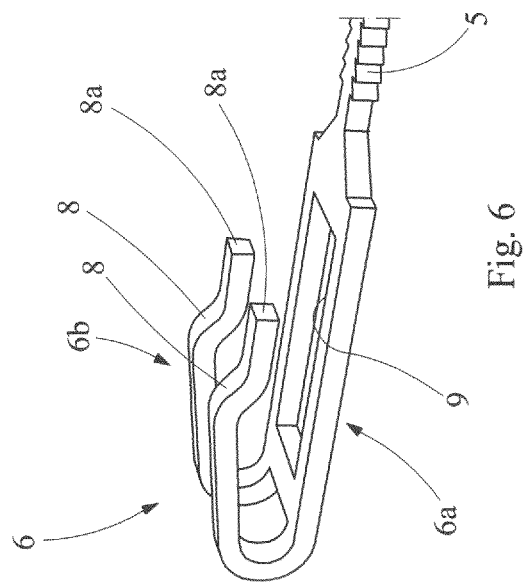
FIGS. 5 and 6 are partial perspective views, on an enlarged scale, of respective components of the detail illustrated in FIGS. 2-4.
Figure 5:
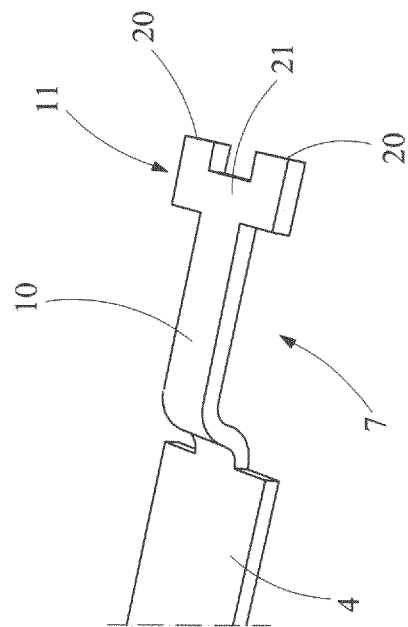

Reference numeral 16 indicates a portion of the main body 14 of the insert, which portion is intended to remain between the head 11 of the element 7 and the first part 6a of the element 6 facing said head, when said elements 6, 7 are in an assembled condition, as can be clearly seen for example from FIGS. 2-4.

In the main body 14 of the insert a recess is also defined, indicated as a whole with 17, which recess is made in a position contiguous to the portion 16 of the insert and is intended to receive, at least partially, the head 11 during the relative movement of relative articulation between the first and the second element 6, 7.

In greater detail, the recess 17 is defined by two cavities 18a, 18b separated by a wall 19, with respect to which the cavities are formed in a mirror-like symmetrical way.

The head 11 has a pair of limbs 20 at a distance from each other, as well as projecting, in an equally oriented manner, from a common portion 21 of the head intended to connect to the body 10.

Said limbs 20 are able to engage the respective cavities 18a, 18b defining the recess 17.

A shoulder surface 22 is also defined in the shoulder 15 of the insert, the profile of which shoulder surface extends vertically from the main insert body 14, close to the recess 17, and whose main function is to contact the head 11 during the rod-lug articulation movement when the head is in the engagement position in the recess 17.

By virtue of the shape and positioning of the insert 12 between the articulation elements 6, 7, during the movement between respective opening and closing positions of the rod 5 on the mount, the second articulation element 7 can be moved to and from said positions, in a guided and contacted manner between the insert 12 and the second part 6b of the element 6, to achieve a hinge movement between the lug and the rod. In this movement, the head 11 remains in a position between the arms 8 and the portion 16 of the insert during the movement of the rod between the open and closed position, and engages the cavities 18a, 18b of the recess 17 in the closed position, contacted by the shoulder surface 22.

The arms 8 of the first articulation element 6 are arranged, due to the material with which they are made and/or their shape, with a specific resilient yielding, so that, as a consequence of a mutual distancing of the first and second parts of the first articulation element 6 induced by the movement of the head 11 during the rotational movement of the second element 7 with respect to the first element 6, a resilient return stress of the second part 6b towards the first part 6a of the first articulation element 6 is generated.

Moreover, by virtue of the pressure exerted by the resilient arms 8 of the second part 6b, which pressure is generated by the resilient reaction caused by the dimensions of the insert 12 (and acting in the transverse direction), the insert 12 is kept adherent to the rod body, at the first part 6a of the element 6, said insert in fact being made integral with the rod.

Reference numerals 23a, 23b indicate a pair of projections, extending from the main body 14 of the insert 12 and running parallel and spaced apart from each other, each projection extending laterally adjacent to the corresponding arm 8 of the second part 6b of element 6, following the assembly of the insert 12 between the elements 6, 7. With such a configuration, the elongated body 10 of the second element 7 is received and guided between the projections 23a, 23b during the movement between the open and closed positions of the rod. In other words, the projections 23a, 23b perform a lateral guiding function which make the assembly of the elements 6, 7 and the relative rotational movement more stable.

The insert 12 is conveniently made of a suitable material, for example of plastics material, so that the articulation elements 6, 7, which constitute the fundamental components of the hinge between rod and lug, generally of a metal nature, are preserved from any wear or superficial deterioration. In particular, the arrangement of the insert portion 16 between the articulation elements 6, 7 prevents the direct sliding contact, during the rotation of the rod, between the head 11 and the first part 6a of the articulation element 6, preserving the latter from phenomena of wear and superficial deterioration, and consequently said element will not show, over time, evident signs of surface damage and relative visible aesthetic defect.

The insert 12 may be conveniently made of a plastics material by injection moulding or by casting moulding. In this way, it is also possible to obtain an insert in pre-coloured material, that is, the insert may exhibit its definitive colour upon extraction from the forming mould, without requiring the application of any surface colouring treatment. In fact, it is known to produce objects by injection moulding using pre-coloured raw plastics material (injection granules), or alternatively by injecting mixtures of 'natural' raw material granules with colouring materials (so-called masterbatch granules, or possibly powders of appropriate pigments).

Similarly, also in the field of moulding plastics materials by casting, it is known to colour the moulded piece by casting pre-coloured resins, or resins mixed with substances with a colouring function.

Alternatively, it is also possible to obtain the insert 12 in plastics material by mechanical processing of a semi-finished product of a simple shape (such as for example a pre-extruded sheet).

In this case, the starting semi-finished product will already have the final colour. For example, an extruded sheet already subjected to colouring may be used in a similar way to that obtainable by injection moulding.

Having a colour extended to its entire volume, the pre-coloured plastics insert 12, even if possibly subject to a certain degree of wear, will not show evident signs of surface damage and relative visible aesthetic defect.

In fact, whatever the thickness of the surface layer of material possibly removed from the insert, the latter will continue to always show the same starting colour. The assembly of the insert 12 with the first and second articulation elements 6, 7 is carried out in a sequence of steps, in which initially the insert 12 is partially inserted between the first 6a and the second part 6b of the first element 6, sliding it on the first element starting from the mouth identified in the region of the ends of the arms 8, in the direction of the opposite 180° folding region of the parts 6a, 6b. Such a partial insertion therefore allows the head 11 of the second element 7 to be temporarily positioned on the insert at the free ends of the arms 8. A subsequent step involves inserting the limbs 20 of the head below the corresponding ends of the arms 8, thus resiliently spreading these ends. The assembly is then completed by carrying out the complete insertion of the insert 12 between the elements 6, 7 with consequent engagement of the base 13 in the opening 9 (suitable for constraining the insert 12 to the first articulation element 6).

The operation of the hinge with the rotation of the rod with respect to the lug between the open and closed positions takes place in the following way, referring to the sequence shown in FIGS. 10-12.

Figure 10:
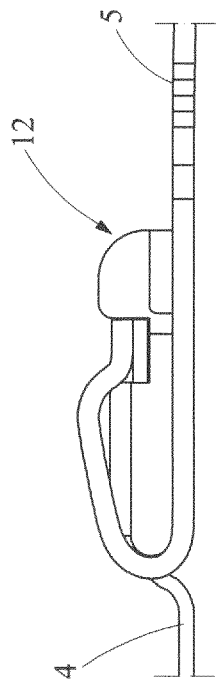
Figure 11:
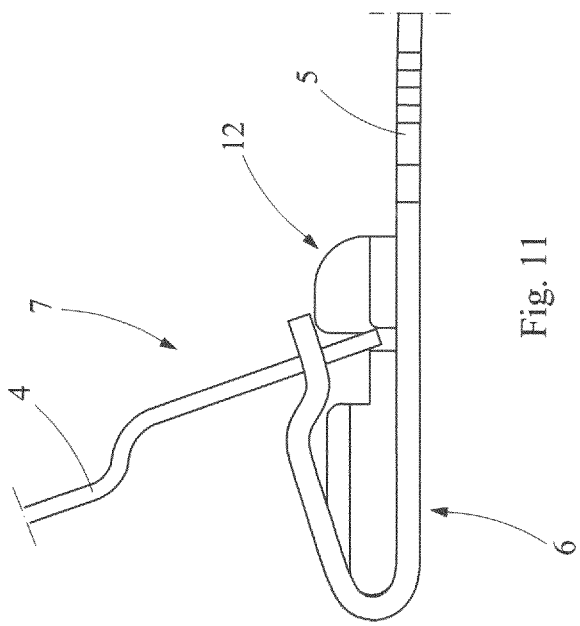
Figure 12:
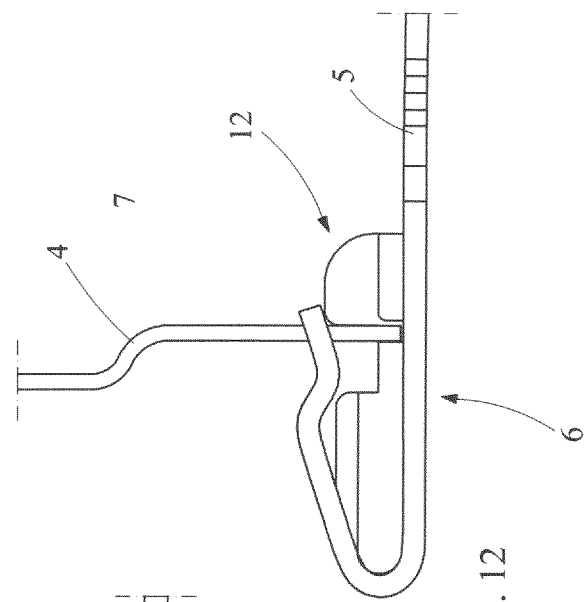

Starting from the open rod position, shown in FIG. 10, the rotation of the rod with respect to the lug determines the rotational movement of the head 11 about a theoretical hinge axis (indicated with X in FIG. 4), with a sliding contact of the head on the portion 16 of the insert (in FIG. 11 an intermediate position of this rotation is shown), until the completion of the rotation equal to an angle of approximately 90° with the achievement of the closed rod position (shown in FIG. 12). In this position, the head 11 abuts, with its limbs 20, inside the recess 17 provided in the insert 12 and is contacted by the shoulder 15 against the shoulder surface 22, the latter thus acting as a means for limiting the rotation of the rod beyond the selected width. Furthermore, in this position, the pressure exerted by the resilient reaction of the arms (which, being distanced from the first part 6a due to the rotation of the head, generate a resilient return action) contributes to blocking the head 11 (and with it the lug) inside the cavities of the recess 17 formed in the insert, thus obtaining a sort of stop for the rod in the closed position.

Furthermore, by virtue of the engagement of the limbs 20 in the cavities of the recess 17 separated by the central wall 19, the head 11 and with it the lug 4 are constrained to the assembly, preventing sliding in a direction parallel to the rod 5, ensuring a stable positioning of the lug with respect to the rod.

Figure 13:
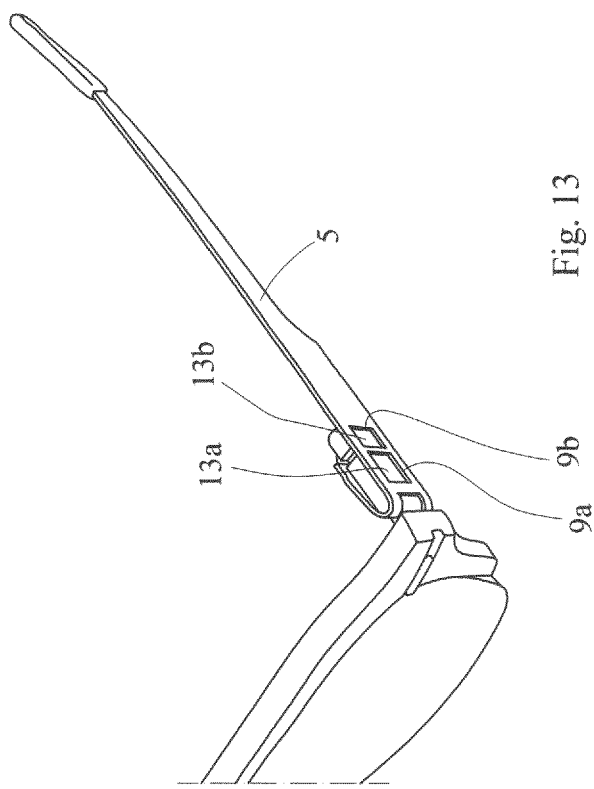
FIG. 13 is a partial perspective view of an embodiment variant of the mount according to the invention.

FIG. 13 partially shows a perspective view of a further example of a mount in a variant of the invention. This variant differs mainly from the example described above in that, in the insert 12, there are two bases 13a, 13b arranged side by side along the prevailing longitudinal extension of the rod. Said bases are arranged to engage, with a formfit, respective openings 9a, 9b made through the first part 6a of the articulation element 6, to make the insert 12 integral with said element 6, in a manner completely similar to the example described above. The provision of two or more bases engaged in the corresponding openings of the first articulation element 6 can satisfy, in particular, aesthetic purposes. In addition, the free surface of each base, that is, the surface that is visible towards the outside of the rod, may also be intended to be decorated in different ways (with appropriate colours, with geometric-decorative motifs, with trademarks or logos, etc.).

A different arrangement of the bases and the corresponding openings for mutual engagement may also be provided. As an alternative to the variant of FIG. 13, in fact, the bases may for example be placed side by side in the direction transversal to the longitudinal axis of development of the rod, other arrangements also being possible.

In a further variant, not shown in the figures, it may be provided that the base 13 is housed, with a formfit, in a sunken blind seat (alternatively to the through opening 9 described above) made in the first part 6a of the first articulation element 6, with a possible coupling with a slight interference fit, again in order to make said insert 12 integral with the first articulation element 6. In this variant, unlike the previous examples, the base 13 of the insert is not visible from the external side of the rod.

The invention thus achieves the proposed objects, achieving numerous advantages over known solutions.

A main advantage consists in that, in the context of rod articulation systems without a hinge pin, with the present invention a relative coupling stability between rod and lug is obtained during the entire movement of the rod as well as in the extreme open and closed positions on the mount, which at the same time prevents, as a result of the surface wear caused by the friction of the coupled parts during the repeated rotations of the rod, damage to the surfaces of the components, thus avoiding the onset of localised aesthetic defects, even before a possible failure of the normal functioning of the joint.

Another advantage is that the operating particularities described above are obtained with a structure that is easy to assemble on the mount, of particular lightness and of limited size, so that it may also be applied in particularly thin and light mounts.

The invention claimed is:

1. Mount for spectacles, comprising a front frame (2) having respective lateral lugs (4) for articulating respective rods (5) in order to articulatedly connect each rod (5) to the front frame (2),
   in each of the rod-lug pairs one of the rod (5) or lug (4) comprises a first articulation element (6) which can articulatedly couple to a second articulation element (7) of the other of the rod (5) or lug (4), said first and second articulation elements (6, 7) hingedly connecting each rod (5) to the relevant lug (4),
   wherein each first articulation element (6) comprises a first part (6a) which extends into a second part (6b) folded onto the first part (6a) in a position facing and at a distance from said first part, said second part (6b) comprising a pair of arms (8) which extend in parallel at a distance from one another as far as respective free ends (8a) of said arms (8),
   each second articulation element (7) comprises a body (10) which extends into an end head (11), said head (11) being received between the first part (6a) and the second part (6b) of the first articulation element (6) at the free ends (8a) of said arms (8),
   said mount comprises an insert (12) which is structurally independent of said first and second articulation elements (6, 7) and is constrained to the first articulation element (6), a portion (16) of said insert (12) being arranged between said head (11) and the first part (6a) of the first articulation element (6) and facing said part, a recess (17) being defined in said insert (12) and configured to receive said head (11), at least in part, during a relative articulation movement of the first articulation element (6) and of the second articulation element (7), a shoulder surface (22) defined on the insert (12) being able to contact said head (11) during the articulation movement when said head is engaged in said recess such that, during the movement between respective open and closed positions of the rod (5) on the mount, the second articulation element (7) can be moved from and towards said positions, in a guided and contacted manner between said insert (12) and said second part (6b) of the first articulation element (6), in order to create a hinge movement between the lug (4) and rod (5), said head (11) remaining in a position between said arms (8) and said portion (16) of the insert during the movement of the rod between the open and closed position, and engaging said recess (17) in the closed position contacted by said shoulder surface (22).

2. The mount according to claim 1, wherein the arms (8) of the first articulation element (6) are resiliently yielding such that, as a result of said first part (6a) and second part (6b) of the first articulation element (6) moving apart from one another, said movement is caused by the movement of the head (11) during the rotational movement of the second element (7) with respect to the first element (6), a resilient return stress of the second part (6b) towards the first part (6a) of said first articulation element (6) is generated.

3. The mount according to claim 1, wherein said insert (12) is made of a plastics material.

4. The mount according to claim 1, wherein said first articulation element (6) is produced from a slab-shaped structure, the second part (6b) of said first element (6) being bent substantially by 180° onto the first part (6a) of the first articulation element (6).

5. The mount according to claim 4, wherein the insert (12) extends inside the space defined between the first part (6a) and the second part (6b) of the first articulation element (6) as far as the bending region of the second part (6b) onto the first part (6a) of said first articulation element (6).

6. The mount according to claim 1, wherein said head (11) is slab-shaped.

7. The mount according to claim 1, wherein said head (11) has a pair of limbs (20) at a distance from one another, said limbs project from a common portion (21) of the head (11) in an equally oriented manner.

8. The mount according to claim 7, wherein said recess (17) is defined by two cavities separated by a central wall, each of said limbs being able to engage a respective cavity.

9. The mount according to claim 1, wherein the insert (12) is provided with at least one slab-shaped base (13) that can engage, in a form fit, a respective opening (9) made in the first part (6*a*) of the first articulation element (6), in order to make said insert (12) integral with the first articulation element (6).

10. The mount according to claim 1, wherein said insert (12) comprises a pair of projections (23*a*, 23*b*) which extend in parallel and at a distance, each projection extending laterally adjacent to the corresponding arm (8) of said second part (6*b*) such that the body (10) of the second articulation element (7) is received and guided between said projections (23*a*, 23*b*) during the movement between said open and closed positions of the rod (5).

11. The mount according to claim 1, wherein said first articulation element (6) and/or said second articulation element (7) are made from a plate made of a metal material.

* * * * *